United States Patent
Pozzi et al.

(10) Patent No.: US 10,479,524 B2
(45) Date of Patent: Nov. 19, 2019

(54) SEAT SENSOR ARRAY AND CONTROLLER AND SEAT ASSEMBLY INCORPORATING SAME

(71) Applicant: B/E Aerospace, Inc., Winston-Salem, NC (US)

(72) Inventors: Alexander N. Pozzi, Winston-Salem, NC (US); Francis Xavier L. Garing, Atlanta, GA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/938,438

(22) Filed: Mar. 28, 2018

(65) Prior Publication Data

US 2019/0300198 A1    Oct. 3, 2019

(51) Int. Cl.
*B64D 45/00* (2006.01)
*B64D 11/06* (2006.01)

(52) U.S. Cl.
CPC ............ *B64D 45/00* (2013.01); *B64D 11/064* (2014.12)

(58) Field of Classification Search
CPC ................................ B64D 45/00; B64D 11/064
See application file for complete search history.

(56) References Cited

U.S. PATENT DOCUMENTS

| | | | | |
|---|---|---|---|---|
| 2009/0108649 | A1* | 4/2009 | Kneller | B64D 11/00 297/217.6 |
| 2009/0243842 | A1* | 10/2009 | Mitchell | G07C 5/08 340/539.26 |
| 2015/0239573 | A1* | 8/2015 | Jouper | B64D 11/0015 701/3 |
| 2017/0144773 | A1* | 5/2017 | Raman | B64D 45/00 |
| 2017/0283086 | A1* | 10/2017 | Garing | B64D 11/00155 |
| 2017/0355282 | A1* | 12/2017 | Zouzal | B60N 2/0244 |

* cited by examiner

*Primary Examiner* — Mohamed Barakat
(74) *Attorney, Agent, or Firm* — Clements Bernard Walker

(57) ABSTRACT

A seat sensor array for use in an aircraft or the like, including: a passenger presence sensor operable for determining if a passenger is present in/absent from a seat; a seat back position sensor operable for determining if a seat back of the seat is in a reclined/upright position; a seat cushion engagement sensor operable for determining if a seat cushion of the seat is dislodged/removed from the seat; and a controller in communication with the passenger presence sensor, the seat back position sensor, and the seat cushion engagement sensor operable for receiving passenger presence information from the passenger presence sensor, seat back position information from the seat back position sensor, and seat cushion engagement information from the seat cushion engagement sensor and communicating this passenger presence information, seat back position information, and seat cushion engagement information to a crew member via wired or wireless means.

20 Claims, 3 Drawing Sheets

SEAT SENSOR ARRAY AND CONTROLLER AND SEAT ASSEMBLY INCORPORATING SAME

BACKGROUND

In air travel and the like, it is important to identify the presence or absence of a passenger in or from each seat in the passenger compartment. This aides in the onboarding process and allows a flight crew to verify that an aircraft is secured and ready for takeoff or landing, for example. Typically, such identification is performed by visual inspection by the flight crew. This is a labor intensive process and does not ensure that a passenger does not leave his or her seat after the visual inspection is performed, for example.

In air travel and the like, for safety reasons, it is also important to verify that each and every seat back is in an upright position before takeoff or landing, for example. Again, such verification is typically performed by visual inspection by the flight crew. This is a labor intensive process and does not ensure that a passenger does move leave his or her seat back after the visual inspection is performed, for example.

In air travel and the like, for safety reasons, it is further important to determine if a seat cushion is dislodged or removed. Such a dislodged seat cushion could indicate the presence of a prohibited object beneath the seat cushion or prevent the seat cushion from functioning as intended during an emergency. Again, such determination is typically performed by visual inspection by the flight crew. This is a labor intensive process and does not ensure that a passenger does dislodge his or her seat cushion after the visual inspection is performed, for example.

Although there are existing systems and methods available for individually identifying the presence or absence of a passenger in or from a given seat in the passenger compartment, verifying that a given seat back is in an upright position, and determining if a given seat cushion is dislodged or removed, what are still needed in the art are systems or methods for performing and coordinating more than one of these functions simultaneously.

SUMMARY

In one aspect, embodiments of the inventive concepts disclosed herein are directed to a seat sensor array for use in a transportation vehicle such as an aircraft, including: a passenger presence sensor operable for determining if a passenger is present in or absent from a seat; a seat back position sensor operable for determining if a seat back of the seat is in a reclined or upright position; and a controller in communication with the passenger presence sensor and the seat back position sensor operable for receiving passenger presence information from the passenger presence sensor and seat back position information from the seat back position sensor and communicating this passenger presence information and seat back position information to a crew member. In another aspect, the seat sensor array further includes a seat cushion engagement sensor operable for determining if a seat cushion of the seat is dislodged or removed from the seat. In a further aspect, the controller is also in communication with the seat cushion engagement sensor and is also operable for receiving seat cushion engagement information from the seat cushion engagement sensor and communicating this seat cushion engagement information to the crew member. In a still further aspect, the seat cushion engagement sensor includes an electrical circuit that is broken when the seat cushion of the seat is dislodged or removed from the seat. In a still further aspect, the passenger presence sensor is an electromagnetic beam sensor. In a till further aspect, the electromagnetic beam sensor is coupled to one of a seat back of another seat and a bulkhead disposed in front of the seat and projects an electromagnetic beam into a passenger receiving portion of the seat. In a still further aspect, the seat back position sensor is a gyroscopic sensor coupled to the seat back of the seat. In a still further aspect, the controller is coupled to a wireless transmitter that communicates the passenger presence information and seat back position information to one of a management system and a mobile device used by the crew member. Finally, in a still further aspect, the controller is coupled to a wireless transmitter that communicates the passenger presence information, seat back position information, and seat cushion engagement information to one of a management system and a mobile device used by the crew member.

In another aspect, embodiments of the inventive concepts disclosed herein are directed to a seat assembly for use in a transportation vehicle such as an aircraft, including: a seat including a seat back and a seat cushion; a passenger presence sensor operable for determining if a passenger is present in or absent from the seat; a seat back position sensor operable for determining if the seat back of the seat is in a reclined or upright position; and a controller in communication with the passenger presence sensor and the seat back position sensor operable for receiving passenger presence information from the passenger presence sensor and seat back position information from the seat back position sensor and communicating this passenger presence information and seat back position information to a crew member. In another aspect, the seat assembly further includes a seat cushion engagement sensor operable for determining if the seat cushion of the seat is dislodged or removed from the seat. In a further aspect, the controller is also in communication with the seat cushion engagement sensor and is also operable for receiving seat cushion engagement information from the seat cushion engagement sensor and communicating this seat cushion engagement information to the crew member. In a still further aspect, the seat cushion engagement sensor includes an electrical circuit that is broken when the seat cushion of the seat is dislodged or removed from the seat. In a still further aspect, the passenger presence sensor is an electromagnetic beam sensor. In a still further aspect, the electromagnetic beam sensor is coupled to one of a seat back of another seat and a bulkhead disposed in front of the seat and projects an electromagnetic beam into a passenger receiving portion of the seat. In a still further aspect, the seat back position sensor is a gyroscopic sensor coupled to the seat back of the seat. In a still further aspect, the controller is coupled to a wireless transmitter that communicates the passenger presence information and seat back position information to one of a management system and a mobile device used by the crew member. Finally, in a still further aspect, the controller is coupled to a wireless transmitter that communicates the passenger presence information, seat back position information, and seat cushion engagement information to one of a management system and a mobile device used by the crew member.

In a further aspect, embodiments of the inventive concepts disclosed herein are directed to a controller for a seat sensor array for use in a transportation vehicle such as an aircraft, including: a passenger presence sensor link to a passenger presence sensor operable for determining if a passenger is present in or absent from a seat; a seat back position sensor link to a seat back position sensor operable for determining if a seat back of the seat is in a reclined or upright position; and a communication link operable for receiving passenger presence information from the passenger presence sensor link and seat back position information from the seat back position sensor link and communicating this passenger presence information and seat back position information to a crew member. In another aspect, the controller further includes a seat cushion engagement sensor link to a seat cushion engagement sensor operable for determining if a seat cushion of the seat is dislodged or removed from the seat, wherein the communication link is also operable for receiving seat cushion engagement information from the seat cushion engagement sensor link and communicating this seat cushion engagement information to the crew member. In a further aspect, the controller still further includes a wireless link that communicates information to one of a management system and a mobile device used by the crew member.

Embodiments of the inventive concepts can include one or more or any combination of the above aspects, features, and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

Figure 1:
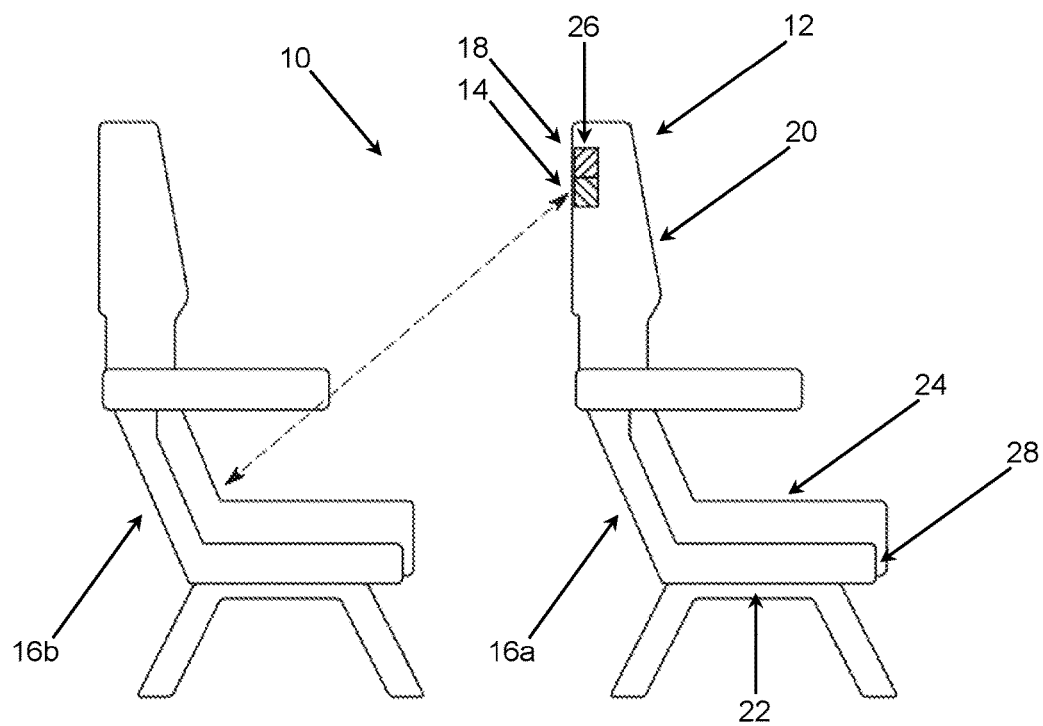
FIG. 1 is a planar view of one exemplary embodiment of the seat sensor array and seat assembly of the present disclosure.

Referring specifically to FIG. 1, the inventive concepts disclosed herein are generally directed to a seat sensor array 10 that is coupled to a seat assembly 12 in the passenger compartment of an aircraft or the like. The seat sensor array 10 includes three distinct types of sensors: (1) a passenger presence sensor 14 operable for determining if a passenger is present in or absent from a seat 16a; (2) a seat back position sensor 18 operable for determining if a seat back 20 of the seat 16a is in a reclined or upright position; and (3) a seat cushion engagement sensor 22 operable for determining if a seat cushion 24 of the seat 16a is dislodged or removed from the seat 16a. Optionally, the passenger presence sensor 14 and the seat back position sensor 18 are disposed in a common housing 26 located in or around the seat back 20 of the seat 16a, while the seat cushion engagement sensor 22 is located in or around a seat pan support frame 28 supporting the seat cushion 24 of the seat 16a. In this configuration, the passenger presence sensor 14 is operable for determining if a passenger is present in or absent from a seat 16b that is adjacent to the seat 16a in which the passenger presence sensor 14 is located. It should be noted that other sensor placements are equally possible and all seats 16 are preferably comparably equipped. For example, the passenger presence sensor 14 could be disposed in the bottom of the overhead compartment above a given seat 16.

In one exemplary embodiment, the passenger presence sensor 14 is an electromagnetic beam sensor, such as a visible or infrared (IR) beam sensor or the like. Such electromagnetic beam sensors consist of photoelectric sensors that emit light from an emitter, such as a light emitting diode (LED), a laser diode, or the like, and deliver it to a receiver, such as a photodiode or phototransistor. The electromagnetic beam sensor may be a through-beam sensor, with the emitter disposed in the housing 26 and the receiver disposed in a passenger receiving portion of the seat 16b. Alternatively, the electromagnetic beam sensor may be a retro-reflective sensor, with the emitter and receiver disposed in the housing 26 and a reflector disposed in the passenger receiving portion of the seat 16b. Alternatively, and most preferably, the electromagnetic beam sensor may be a diffusion sensor, with the emitter and receiver disposed in the housing 26 and the passenger receiving portion of the seat 16b and/or passenger acting as the reflector. In general, the passenger presence sensor 14 typically measures the distance to the passenger receiving portion of the seat 16b without a passenger present and compares this measurement to the distance to the passenger when present. When a given threshold is exceeded, the passenger is deemed present.

In one exemplary embodiment, the seat back position sensor 18 is a simple electromagnetic position sensor or a gyroscopic (gyro) sensor. A gyro sensor is an angular rate sensor or angular velocity sensor that can sense angular motion and changes in orientation. Gyro sensors can sense angular velocity due to the Coriolis force that is applied to a vibrating element, for example. This motion produces a potential difference from which angular velocity is derived. The angular velocity is converted into an electrical signal output.

Figure 2:
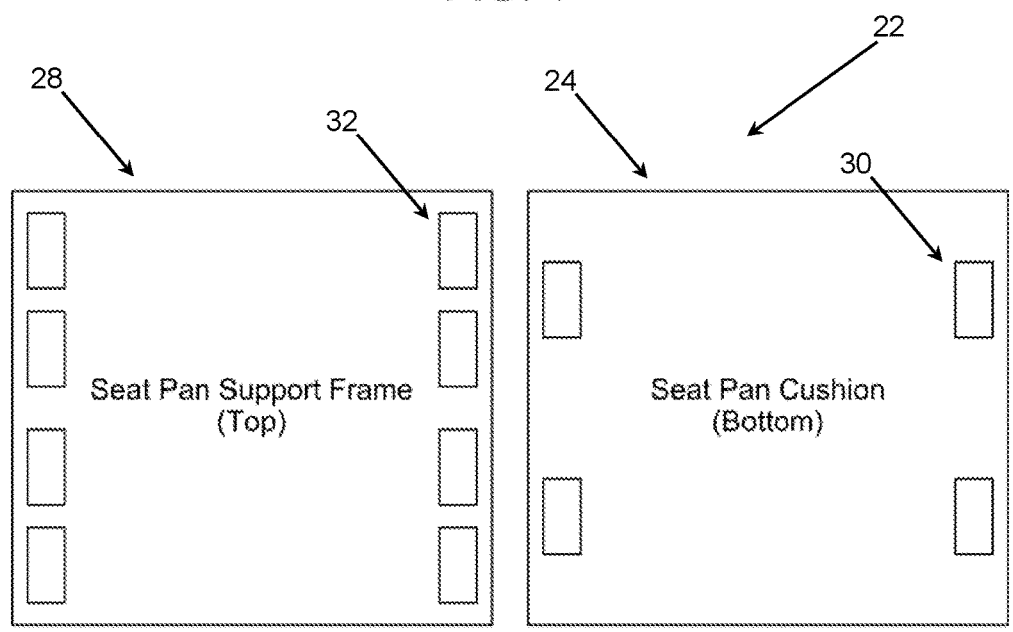
FIG. 2 is a planar view of one exemplary embodiment of the seat cushion engagement sensor assembly of the present disclosure.

Referring specifically to FIG. 2, in one exemplary embodiment, the seat cushion engagement sensor 22 includes a plurality of contacts 30 coupled to the bottom of the seat cushion 24 that are electrically coupled to a plurality of contacts 32 coupled to the top of the seat pan support frame 28 when the seat cushion 24 is fully engaged with the seat pan support frame 28. For example, contacts 30 and 32 may be disposed in the corners of the seat cushion 24 and seat pan support frame 28 such that it can be determined if one or more corners of the seat cushion 24 is/are dislodged from the seat pan support frame 28. Each of the contacts 30 and 32 may be a conductive hook-and-loop type fastener or the like. Each of the contacts 30 and 32 is in electrical communication with a processor such that breaks in the associated electrical circuits can be detected and assessed.

Figure 3:
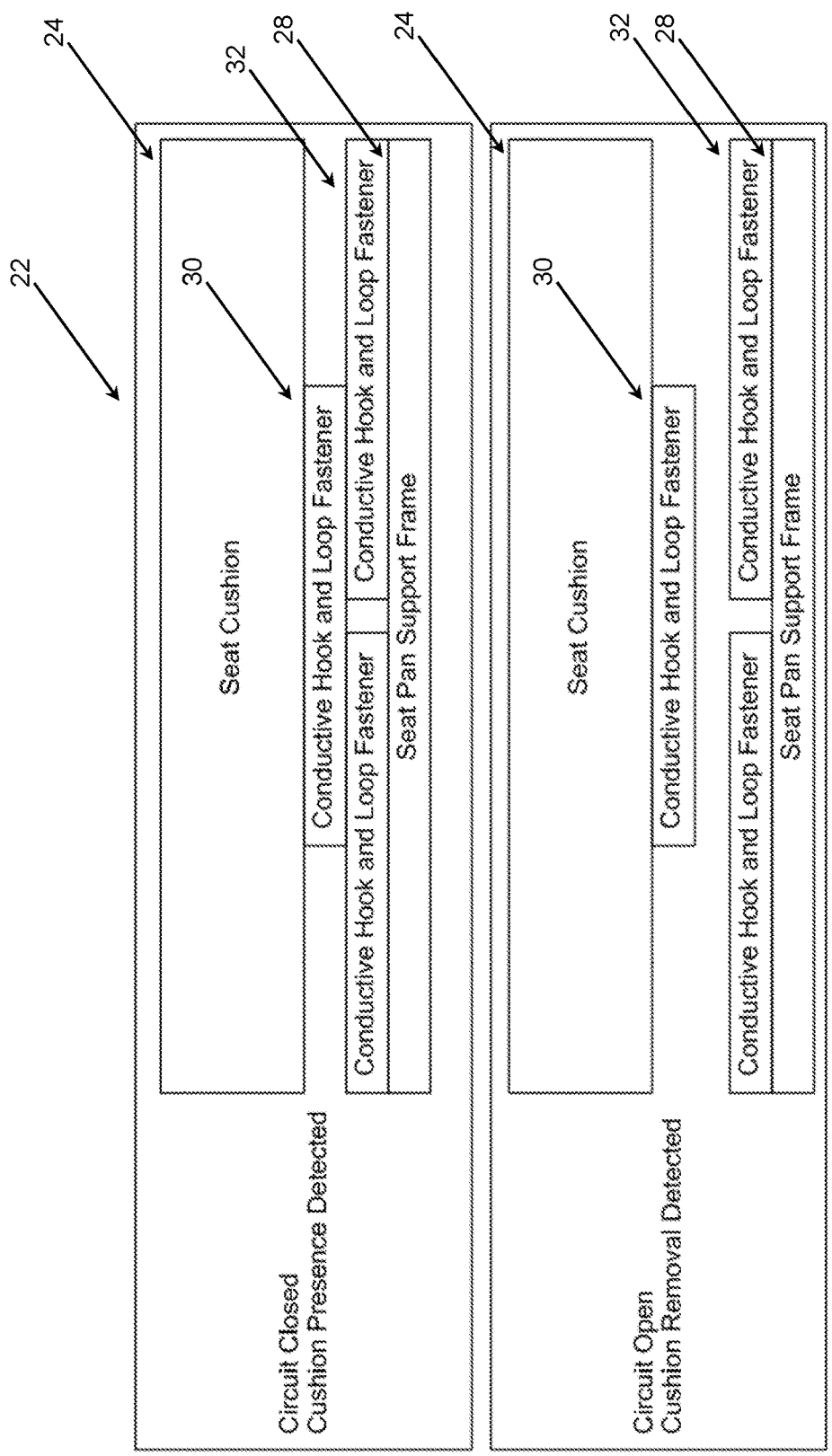
FIG. 3 is a schematic view of one exemplary embodiment of the seat cushion engagement sensor assembly of the present disclosure in both closed circuit (seat cushion present/engaged) and open circuit (seat cushion absent/disengaged) configurations.

FIG. 3 illustrates the seat cushion engagement sensor 22 is a closed circuit configuration, with the seat cushion 24 engaging the seat pan support frame 28 and the associated contacts 30 and 32 making electrical contact, and an open circuit configuration, with the seat cushion 24 disengaged from the seat pan support frame 28 and the associated contacts 30 and 32 failing to make electrical contact.

Figure 4:
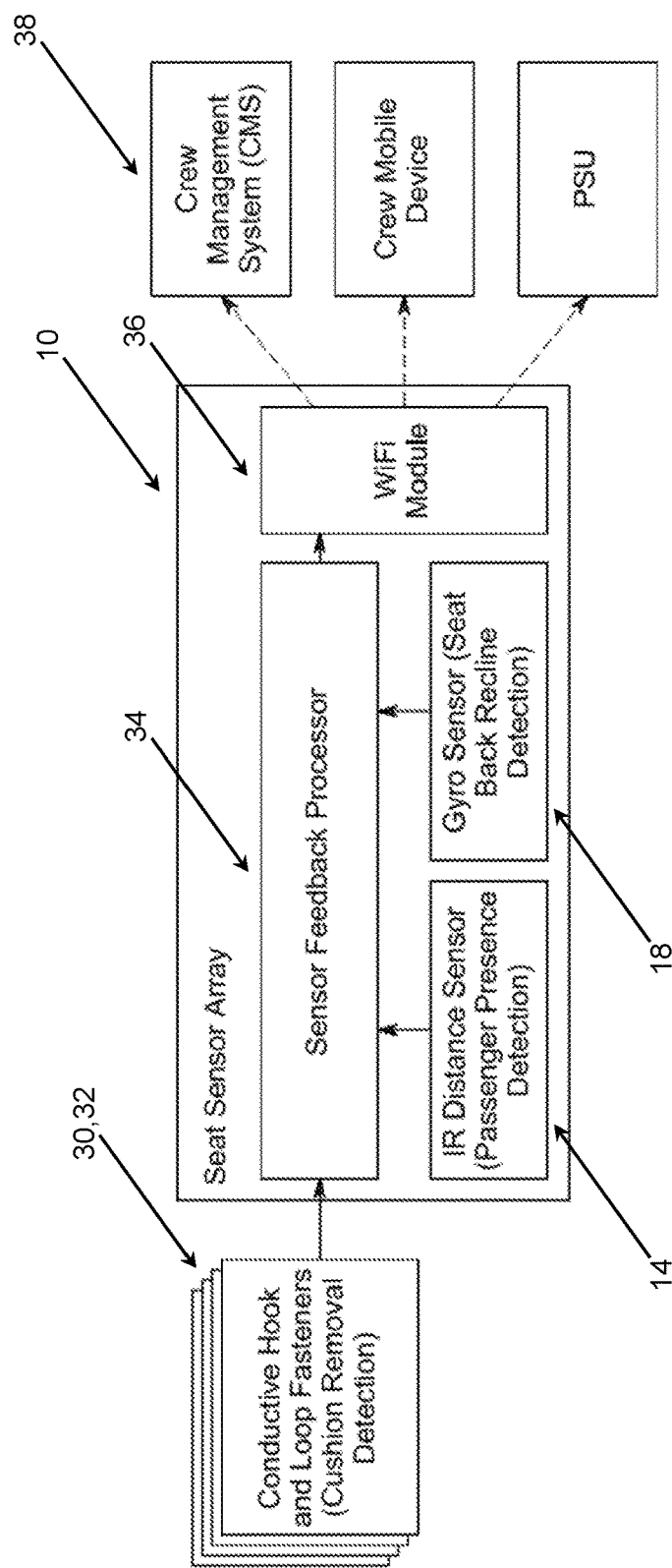
FIG. 4 is a schematic view of one exemplary embodiment of the seat sensor controller of the present disclosure.

Referring specifically to FIG. 4, in one exemplary embodiment, a controller/processor 34 is in communication with the passenger presence sensor 14, the seat back position sensor 18, and the seat cushion engagement sensor 22 and operable for receiving passenger presence information from the passenger presence sensor 14 via a passenger presence sensor link, seat back position information from the seat back position sensor 18 via a seat back position sensor link, and seat cushion engagement information from the seat cushion engagement sensor 22 via a seat cushion engagement sensor link. This passenger presence information, seat back position information, and seat cushion engagement information is collected, analyzed, processed, and displayed to a crew member or the like in an easy to digest textual or graphical format. For example, a text message or mobile app alert could be sent to the crew member indicating that a given passenger is (partially or wholly) present or absent, a given seat back is (partially or wholly) reclined or upright, and/or a given seat cushion is (partially or wholly) engaged or disengaged. This alert may incorporate an event alarm triggered by a predetermined condition and may take the form of a graphical representation of the passenger compartment of the aircraft including all seats and/or a given seat.

Accordingly, the controller/processor 34 is optionally coupled to a wireless transmitter 36 that communicates the passenger presence information, seat back position information, and seat cushion engagement information to a crew alert device 38 like a management system, such as a crew management system (CMS), a mobile device used by a given crew member, etc. It will be readily apparent to those of ordinary skill in the art that dedicated wired links may also be used equally. In this respect, all sensor links can be part of a wireless local area network (WLAN) associated with the seat sensor array 10.

A server, when used, is a digital computer that, in terms of hardware architecture, generally includes a processor, input/output (I/O) interfaces, a network interface, a data store, and memory. It should be appreciated by those of ordinary skill in the art that a practical embodiment of the server may include additional components and suitably configured processing logic to support known or conventional operating features that are not described in detail herein. The components are communicatively coupled via a local interface. The local interface may be, for example but not limited to, one or more buses or other wired or wireless connections, as is known in the art. The local interface may have additional elements, which are omitted for simplicity, such as controllers, buffers (caches), drivers, repeaters, and receivers, among many others, to enable communications. Further, the local interface may include address, control, and/or data connections to enable appropriate communications among the aforementioned components.

The controller/processor 34 is a hardware device for executing software instructions. The controller/processor 34 may be any custom made or commercially available processor, a central processing unit (CPU), an auxiliary processor among several processors associated with the server, a semiconductor-based microprocessor (in the form of a microchip or chip set), or generally any device for executing software instructions. When the server is in operation, the controller/processor 34 is configured to execute software stored within the memory, to communicate data to and from the memory, and to generally control operations of the server pursuant to the software instructions. The I/O interfaces may be used to receive user input from and/or for providing system output to one or more devices or components. User input may be provided via, for example, a keyboard, touch pad, and/or a mouse. System output may be provided via a display device and a printer (not shown). I/O interfaces may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 106 may be used to enable the server to communicate on a network, such as the Internet, a wide area network (WAN), a local area network (LAN), and the like, etc. The network interface 106 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n). The network interface 106 may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server.

The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but can be accessed by the controller/processor 34. The software in memory may include one or more software programs, each of which includes an ordered listing of executable instructions for implementing logical functions. The software in the memory includes a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

The mobile device can be a digital device that, in terms of hardware architecture, generally includes a processor, input/output (I/O) interfaces, a radio, a data store, and memory. It should be appreciated by those of ordinary skill in the art that a practical embodiment may include additional components and suitably configured processing logic to support known or conventional operating features that are not described in detail herein. The components are communicatively coupled via a local interface. The local interface can be, for example but not limited to, one or more buses or other wired or wireless connections, as is known in the art. The local interface can have additional elements, which are omitted for simplicity, such as controllers, buffers (caches), drivers, repeaters, and receivers, among many others, to enable communications. Further, the local interface may include address, control, and/or data connections to enable appropriate communications among the aforementioned components.

The processor is a hardware device for executing software instructions. The processor can be any custom made or commercially available processor, a central processing unit (CPU), an auxiliary processor among several processors associated with the memory, a semiconductor-based microprocessor (in the form of a microchip or chip set), or generally any device for executing software instructions. When the mobile device is in operation, the processor is configured to execute software stored within the memory, to communicate data to and from the memory, and to generally control operations of the mobile device pursuant to the software instructions. In an exemplary embodiment, the processor may include a mobile optimized processor such as optimized for power consumption and mobile applications. The I/O interfaces can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces can also include, for example, a serial port, a parallel port, a small computer system interface (SCSI), an infrared (IR) interface, a radio frequency (RF) interface, a universal serial bus (USB) interface, and the like. The I/O interfaces can include a graphical user interface (GUI) that enables a user to interact with the memory. Additionally, the I/O interfaces may further include an imaging device, i.e. camera, video camera, etc.

The radio enables wireless communication to an external access device or network. Any number of suitable wireless data communication protocols, techniques, or methodologies can be supported by the radio, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); Land Mobile Radio (LMR); Digital Mobile Radio (DMR); Terrestrial Trunked Radio (TETRA); Project 25 (P25); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality with the mobile device. In a typical example, the end user typically uses one or more of the programs along with a network. The programs can include an application or "app" which provides various functionality in communication with the seat sensor array 10.

In general, all housings and memories described herein may be hardened such that components and data may be preserved in the event of a catastrophic occurrence or the like.

Again, the seat sensor array 10 described herein aides in the onboarding process and allows a flight crew to verify that an aircraft is secured and ready for takeoff or landing, for example. Typically, such identification is performed by visual inspection by the flight crew. This is a labor intensive process and does not ensure that a passenger does not leave his or her seat after the visual inspection is performed, for example. Further, the seat sensor array 10 described herein allows the flight crew to verify that each and every seat back is in an upright position before takeoff or landing, for example. Again, such verification is typically performed by visual inspection by the flight crew. This is a labor intensive process and does not ensure that a passenger does move leave his or her seat back after the visual inspection is performed, for example. Further, the seat sensor array 10 described herein allows the flight crew to determine if a seat cushion is dislodged or removed. Such a dislodged seat cushion could indicate the presence of a prohibited object beneath the seat cushion or prevent the seat cushion from functioning as intended during an emergency. Again, such determination is typically performed by visual inspection by the flight crew. This is a labor intensive process and does not ensure that a passenger does dislodge his or her seat cushion after the visual inspection is performed, for example.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A seat sensor array for use in an aircraft, comprising:
a passenger presence sensor located on a first seat, the passenger presence sensor operable for determining if a passenger is present in or absent from a second seat based on a comparison of a measured distance to a passenger receiving portion of the second seat when unoccupied to a measured distance to a passenger present in the second seat when occupied, wherein when a given threshold is exceeded a passenger is deemed present in the second seat;

a seat back position sensor collocated on the first seat with the passenger presence sensor and operable for determining if a seat back of the first seat is in a reclined or upright position; and a controller in communication with the passenger presence sensor and the seat back position sensor operable for receiving passenger presence information from the passenger presence sensor and seat back position information from the seat back position sensor and communicating this passenger presence information and seat back position information to a crew member device configured to trigger an alarm responsive to a sensed condition by at least one of the passenger presence sensor and the seat back position sensor.

2. The seat sensor array of claim 1, further comprising a seat cushion engagement sensor operable for determining if a seat cushion of the first seat is dislodged or removed from the first seat.

3. The seat sensor array of claim 2, wherein the controller is also in communication with the seat cushion engagement sensor and is also operable for receiving seat cushion engagement information from the seat cushion engagement sensor and communicating this seat cushion engagement information to the crew member device.

4. The seat sensor array of claim 2, wherein the seat cushion engagement sensor comprises an electrical circuit that is broken when the seat cushion of the first seat is dislodged or removed from the first seat.

5. The seat sensor array of claim 1, wherein the passenger presence sensor comprises an electromagnetic beam sensor.

6. The seat sensor array of claim 5, wherein the electromagnetic beam sensor projects an electromagnetic beam toward the passenger receiving portion of the second seat.

7. The sensor array of claim 1, wherein the seat back position sensor comprises a gyroscopic sensor coupled to the seat back of the first seat.

8. The sensor array of claim 1, wherein the controller is coupled to a wireless transmitter that communicates the passenger presence information and seat back position information to one of a management system and a mobile device used by the crew member.

9. The sensor array of claim 3, wherein the controller is coupled to a wireless transmitter that communicates the passenger presence information, seat back position information, and seat cushion engagement information to one of a management system and a mobile device used by the crew member.

10. A seat assembly for use in a transportation vehicle, comprising:

a first seat comprising a seat back and a seat cushion;

a passenger presence sensor located on a first seat, the passenger presence sensor operable for determining if a passenger is present in or absent from a second seat based on a comparison of a measured distance to a passenger receiving portion of the second seat when unoccupied to a measured distance to a passenger present in the second seat when occupied, wherein when a given threshold is exceeded a passenger is deemed present in the second seat;

a seat back position sensor collocated on the first seat with the passenger presence sensor and operable for determining if the seat back of the first seat is in a reclined or upright position; and a controller in communication with the passenger presence sensor and the seat back position sensor operable for receiving passenger presence information from the passenger presence sensor and seat back position information from the seat back position sensor and communicating this passenger presence information and seat back position information to a crew member device configured to trigger an alarm responsive to a sensed condition by at least one of the passenger presence sensor and the seat back position sensor;

wherein the passenger presence sensor and the seat back position sensor are disposed in a common housing located in the seat back of the first seat.

11. The seat assembly of claim 10, further comprising a seat cushion engagement sensor operable for determining if the seat cushion of the first seat is dislodged or removed from the first seat.

12. The seat assembly of claim 11, wherein the controller is also in communication with the seat cushion engagement sensor and is also operable for receiving seat cushion engagement information from the seat cushion engagement sensor and communicating this seat cushion engagement information to the crew member device.

13. The seat assembly of claim 11, wherein the seat cushion engagement sensor comprises an electrical circuit that is broken when the seat cushion of the first seat is dislodged or removed from the first seat.

14. The seat assembly of claim 10, wherein the passenger presence sensor comprises an electromagnetic beam sensor.

15. The seat assembly of claim 14, wherein the electromagnetic beam sensor projects an electromagnetic beam toward the passenger receiving portion of the second seat.

16. The seat assembly of claim 10, wherein the seat back position sensor comprises a gyroscopic sensor coupled to the seat back of the first seat.

17. The seat assembly of claim 10, wherein the controller is coupled to a wireless transmitter that communicates the passenger presence information and seat back position information to one of a management system and a mobile device used by the crew member.

18. The seat assembly of claim 12, wherein the controller is coupled to a wireless transmitter that communicates the passenger presence information, seat back position information, and seat cushion engagement information to one of a management system and a mobile device used by the crew member.

19. A controller for a seat sensor array for use in a transportation vehicle, comprising:

a passenger presence sensor link to a passenger presence sensor located on a first seat, the passenger presence sensor operable for determining if a passenger is present in or absent from a second seat based on a comparison of a measured distance to a passenger receiving portion of the second seat when unoccupied to a measured distance to a passenger present in the second seat when occupied, wherein when a given threshold is exceeded a passenger is deemed present in the second seat;

a seat back position sensor link to a seat back position sensor operable for determining if a seat back of the first seat is in a reclined or upright position, the seat back position sensor and the passenger presence sensor collocated in a common housing of the seat back of the first seat;

a communication link operable for receiving passenger presence information from the passenger presence sensor link and seat back position information from the seat back position sensor link and communicating this passenger presence information and seat back position information to a crew member; and one of a wired and wireless link that communicates information to one of a management system and a mobile device used by the crew member configured to trigger an alarm responsive to a sensed condition by at least one of the passenger presence sensor and the seat back position sensor.

20. The controller of claim 19, further comprising a seat cushion engagement sensor link to a seat cushion engagement sensor operable for determining if a seat cushion of the first seat is dislodged or removed from the first seat, wherein the communication link is also operable for receiving seat cushion engagement information from the seat cushion engagement sensor link and communicating this seat cushion engagement information to the crew member.

* * * * *